(12) United States Patent  
Hsu

(10) Patent No.: US 7,813,116 B2
(45) Date of Patent: Oct. 12, 2010

(54) HEART SHAPED STRUCTURE WITH ALTERING APPEARANCE

(75) Inventor: Wei Hsu, Chung Ho (TW)

(73) Assignee: Weistech Technology Co., Ltd., Taipei County (TW)

( * ) Notice: Subject to any disclaimer, the term of this patent is extended or adjusted under 35 U.S.C. 154(b) by 201 days.

(21) Appl. No.: 12/246,162

(22) Filed: Oct. 6, 2008

(65) Prior Publication Data

US 2009/0244823 A1    Oct. 1, 2009

(30) Foreign Application Priority Data

Mar. 25, 2008    (TW) ............... 97110636 A

(51) Int. Cl.
*G06F 1/16* (2006.01)
(52) U.S. Cl. .............. 361/679.33; 273/285; 219/438; 623/1.16; 349/106
(58) Field of Classification Search ............. 206/758, 206/749, 372; 273/285; 219/438, 715; 63/1.16; 361/679.01, 679.3, 679.33, 679.57, 760; 600/37, 508, 16, 439; 623/1.11, 1.15, 1.16, 623/2.11; 349/182, 42, 106, 109
See application file for complete search history.

(56) References Cited

U.S. PATENT DOCUMENTS

| 5,096,204 A * | 3/1992 | Lippman ............... 273/285 |
| 6,205,816 B1 * | 3/2001 | Lu ............... 63/1.16 |
| 2007/0175887 A1 * | 8/2007 | Rogers ............... 219/438 |

* cited by examiner

*Primary Examiner*—Hung V Duong
(74) *Attorney, Agent, or Firm*—Muncy, Geissler, Olds, & Lowe, PLLC

(57) ABSTRACT

The present invention discloses a heart shaped structure with altering appearance comprising: a right base with an accommodating cavity; a left base flippable and pivot-jointed to the accommodating cavity of right base; a right upper cover pivot-jointed to the side of right base, with a fingerprint recognition device and a locking mechanism; and a left upper cover flippable and pivot-jointed to the side of left base. The interior of the right base selectively includes a processing unit, a decoder, a digital to analog converter (DAC), a rechargeable battery, a storage unit, and a display monitor located within the cavity. In addition, an internal speaker, an audio output port, a data transmission port, a recharge port, a power switch and a control panel is selectively located on the outer casing of the right base.

12 Claims, 4 Drawing Sheets

HEART SHAPED STRUCTURE WITH ALTERING APPEARANCE

BACKGROUND OF THE INVENTION

1. Field of the Invention

The present invention relates to a heart shaped accessory structure with altering appearance, more specifically to say, to an accessory with a fingerprint recognition device.

2. Description of the Prior Art

With the advance of technology, varieties of digital devices, for example, digital cameras and digital walkmans, are commonly used in daily life. Because users can store and retrieve image and music by a digital file, the image and music can be enjoyed through cell phone, digital frame, PDA or other portable media player (PMP); therefore, the digital transmitting media, for example, the Flash Disk or the memory card, is also used for transmitting data among digital devices.

General speaking, to emphasize the high-tech appearance, the product's design is masculine and stressing the male consumer's preference not female one's. Furthermore, the product is often un-alterable, and therefore they lose attraction to the consumers while time goes by. Moreover, most of the devices for playing digital image and music on the market are personal digital devices, and most manufactures focus on developing devices with versatile and convenient functions, but neglect the security of data.

According to the description mentioned above, though varieties of devices for playing image and music is available on the market, a device with altering appearance attracting male and female consumers and able to prevent an unauthorized person from approaching the data inside isn't available yet.

SUMMARY OF THE INVENTION

The object of present invention is to providing a heart shaped accessory structure with altering appearance; the appearance of the structure is alterable and attracts male and female consumers.

Another object of the present invention is providing a structure for protecting data by a fingerprint recognition device and therefore the security of data is enhanced.

Another object of the present invention is providing a heart shaped structure with altering appearance, whose functions including playing digital image, digital music and works as a music box for entertainment.

Accordingly, for the purposes list above, the present invention provides a heart shaped structure with altering appearance including: a first (right) base with an accommodating cavity; a second (left) base flippable and pivot-jointed to the accommodating cavity of right base; a right upper cover with a fingerprint recognition device and a locking mechanism, pivot-jointed to the side of the right base; and a left upper cover flippable pivot-jointed to the side of left base. The interior of the right base selectively includes a processing unit, a decoder, a digital to analog converter (DAC), a rechargeable battery, a storage unit, and a display monitor located within the cavity. In addition, an internal speaker, an audio output port, a data transmission port, a recharge port, a power switch and a control panel is located on the outer casing of the right base.

The above mentioned heart-shape structure is also an accessory and the interior of that is used for storing things.

BRIEF DESCRIPTION OF THE DRAWINGS

The present invention can be understood according to the preferred embodiments, description and figures. However, a person skilled in the art should understand that the preferred embodiments of the present invention are for illustration, and not for restricting the scope of the present invention, wherein.

DESCRIPTION OF THE PREFERRED EMBODIMENT

The present invention is described with the preferred embodiments and accompanying drawings. It should be appreciated that all the preferred embodiments are merely used for illustration. Hence, the present invention can also be applied to various embodiments other than the preferred embodiments. The present invention isn't restricted to any specific embodiment and should be interpreted according to the claims and the equivalence thereof. Moreover, the parts of the different elements aren't illustrated proportionally. The main elements are illustrated with large size and the minor elements aren't shown; therefore the present invention can be described and understood clearly.

Figure 1:
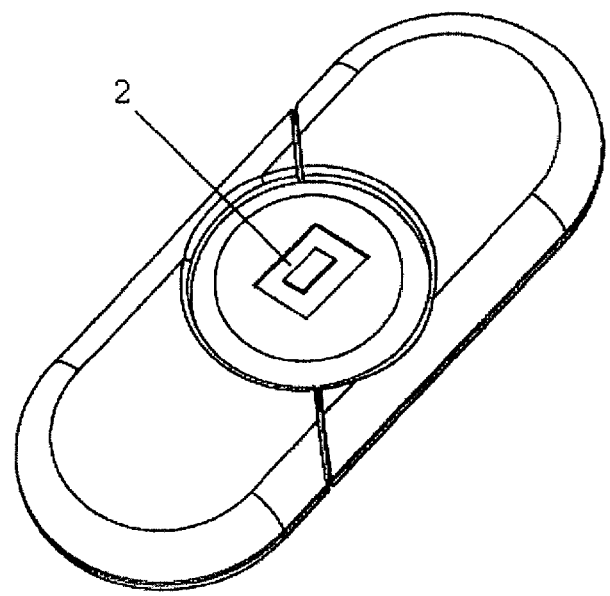
FIG. 1 illustrates the structure of the present invention before the shape changed.

FIG. 1 illustrates the structure provided by the present invention before the shape changed. According to FIG. 1, the center of the structure is the fingerprint recognition device 2 for preventing an unauthorized person from using it; in one embodiment, the device is optional. Before finishing fingerprint recognition, the user can't do any action to the structure. Besides that, the locking bolt 6 of the locking mechanism 4 is stuck inside the locking bolt hole 8 (referring to FIG. 3), and therefore it is impossible to alter the shape of the present invention to the heart shape, or to open the upper cover.

Figure 2:
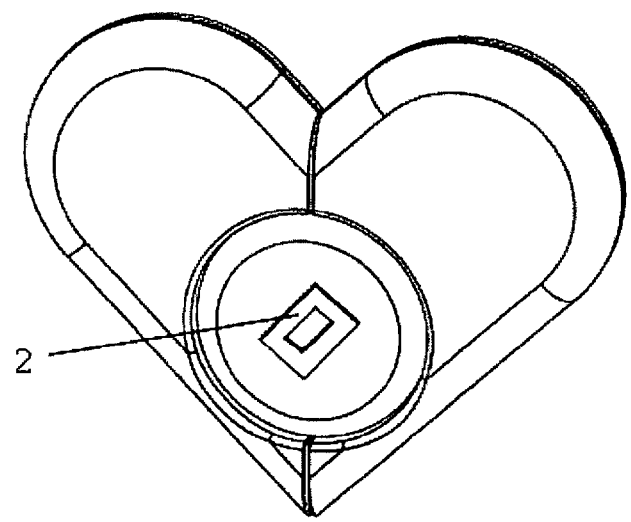
FIG. 2 illustrates the structure of the present invention after the shape changed.
Figure 3:
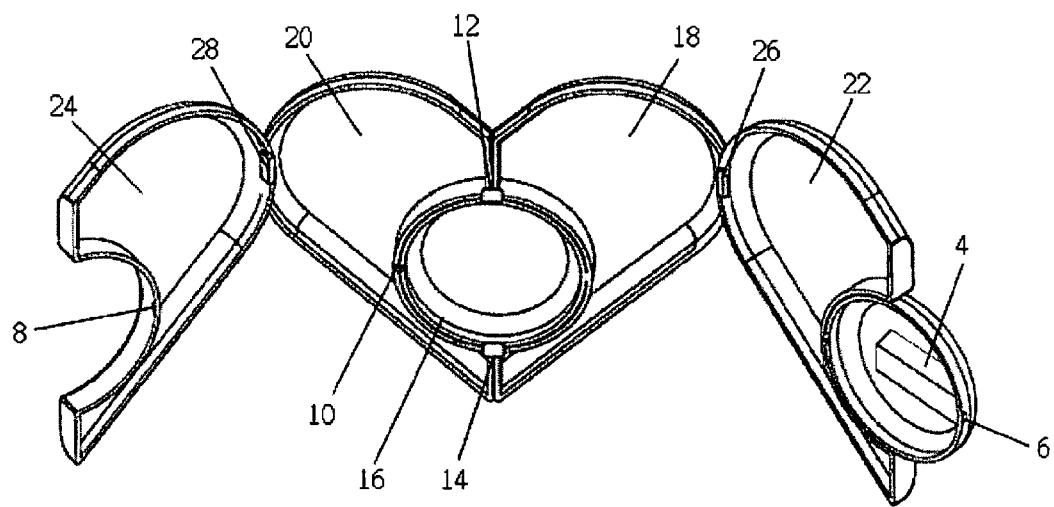
FIG. 3 illustrates the structure of the present invention after the shape changed and opened.

FIG. 2 and FIG. 3 illustrate the structure provided by present invention after the shape changed. Before altering the structure of the present invention into a heart-shape structure, a user should release the locking mechanism 4 by the fingerprint recognition device 2. While the fingerprint of an authorized user is confirmed, the locking bolt 6 insides the locking bolt hole 8 is retracted back to the locking mechanism 4; at the mean time, the user can take the first pivot 10 at left side as the pivot to turn one part of the structure by 180 degree, and therefore a heart-shaped structure is formed; then, the shape is fixed by the first tenon 12 and the second tenon 14, the present invention is the structure including the right base 18 with an accommodating cavity 16, the left base 20, the right upper cover 22 with the fingerprint recognition device 2 and the locking mechanism 4, and the left upper cover 24 pivot-jointed to a part of the structure. The right upper cover 22 and the left upper cover 24 can be opened or closed by utilizing the second pivot 26 and the third pivot 28 respectively. The above mentioned left and right base are for supporting objects and interchangeable, which is within the coverage of the present invention.

Figure 4:
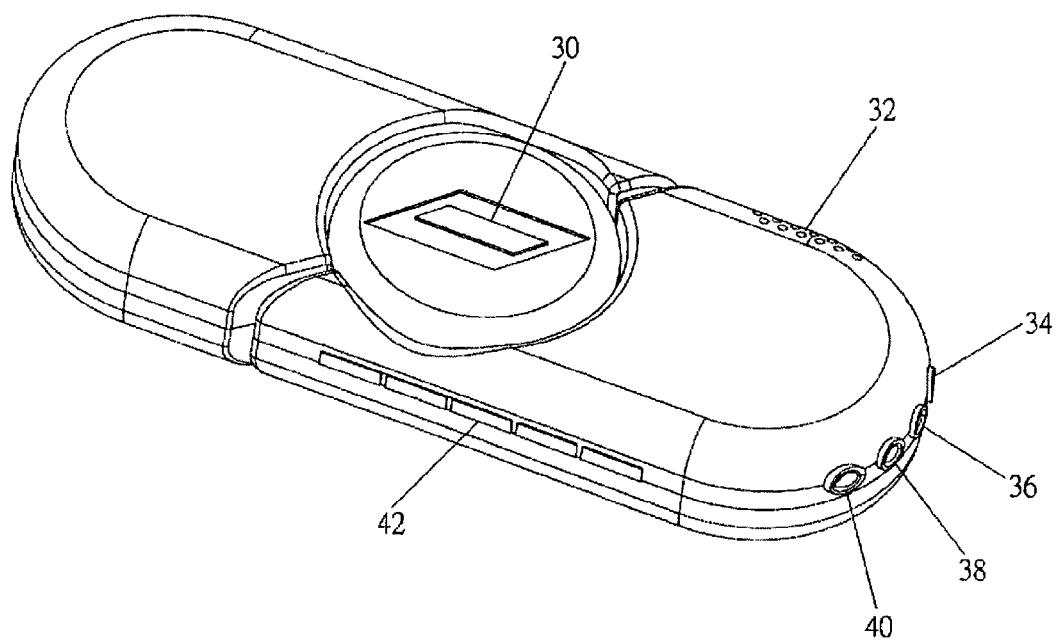
FIG. 4 illustrates the preferred embodiment of the present invention before the shape changed.

FIGS. 4-7 illustrate a preferred embodiment of the present invention, which is the structure with a digital media player. FIG. 4 illustrates a preferred embodiment before the shape changed. As illustrated in the figures, the center is the fingerprint recognition device 30 for preventing an unauthorized person from using it. The other interface includes an internal speaker 32, an audio output port 34, a data transmission port 36, a recharge port 38, a power switch 40 and a control panel 42 located on the outer casing of the right base. The function keys of the control panel 42 include the play/pause button, the forward/backward button and the volume control button. Because the left part of the structure is turntable, for the sake of doing wiring, the main parts and interface are placed or deployed at right part of the structure. The description mentioned above is for illustration, not for restricting the present invention.

Figure 5:
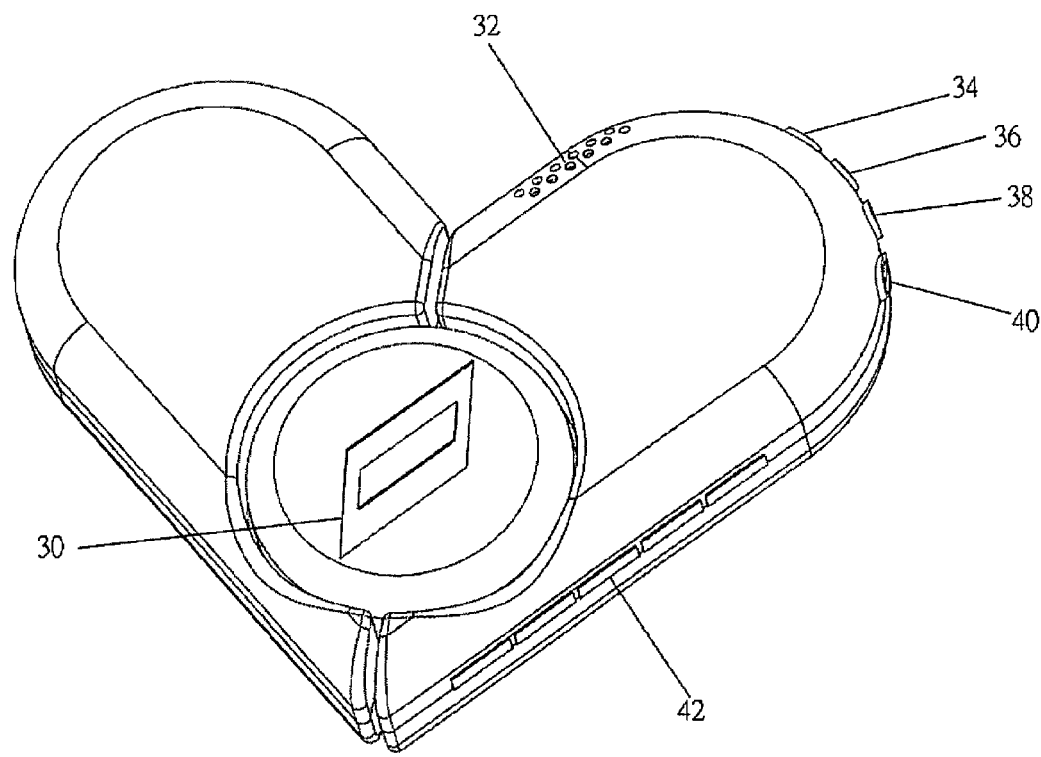
FIG. 5 illustrates the preferred embodiment of the present invention after the shape changed.

FIG. 5 illustrates a preferred embodiment after the shape changed. Before altering the structure into heart-shaped structure, a user has to turn on the power and activate the locking mechanism 44 by fingerprint recognition device 30. While the fingerprint of an authorized user is confirmed, the electricity-driven locking bolt 46 insides the locking mechanism 44 is retracted back from the locking bolt hole 48 to the locking mechanism 44. At the mean time, the user can take the first pivot 50 (referring to FIG. 6) at left side as a pivot to turn one part of the structure by 180 degree and therefore a heart-shape structure is formed; then the shape is fixed by the first tenon 52 and the second tenon 54.

Figure 6:
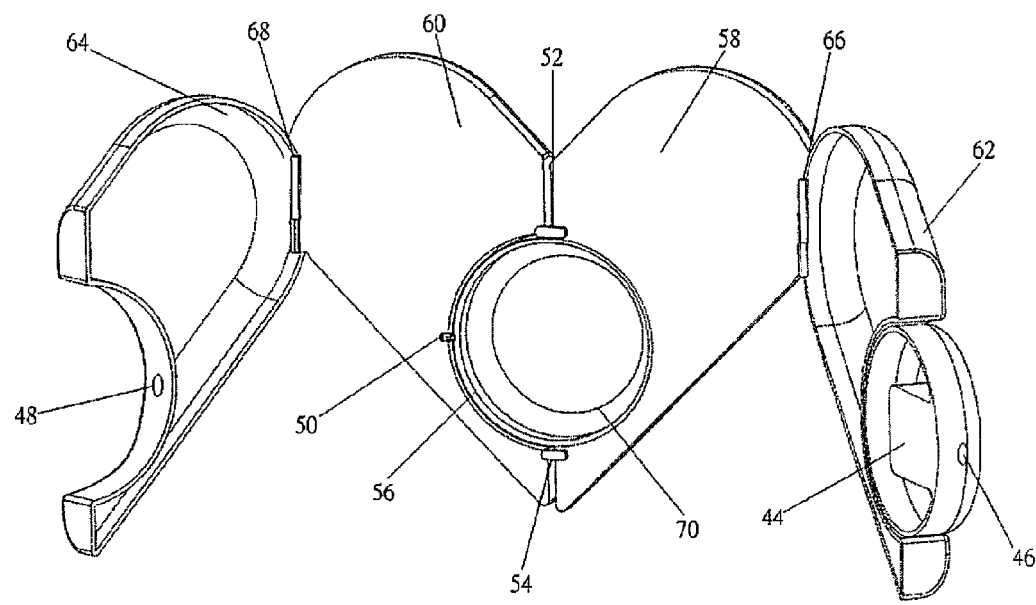
FIG. 6 illustrates the preferred embodiment of the present invention after the shape changed and opened.

FIG. 6 illustrates the structure after the shape changed and the right upper cover is opened. As illustrated, it is the structure constructed by the right base 58 with the accommodating cavity 56 in which a display monitor is located, the left base 60, the right upper cover 62 with the fingerprint recognition device 30, with the locking mechanism 44, and the left upper cover 64 bolt-jointed to a part of the structure. The right upper cover 62 and the left upper cover 64 are opened and closed by the second pivot 66 and the third pivot 68, respectively. A monitor 70 is embedded in the cavity 56; the other parts and the relevant electronic circuit is deployed inside the right base 58. The display 70 is the light display with low electricity consumption, which can be a liquid crystal Display (LED), a organic light emitting display (OLED), or a field emitting display (FED).

Figure 7:
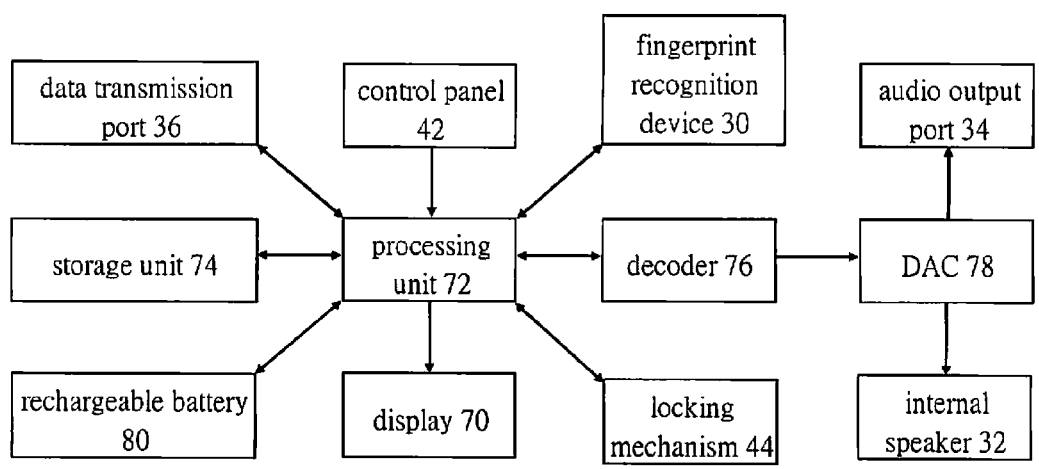
FIG. 7 illustrates the block diagram showing the internal parts of the preferred embodiment of the present invention.

FIG. 7 is the diagram of the preferred embodiment mentioned above, it illustrates the parts inside the right base 58, including the process unit 72, the storage unit 74, the decoder 76, the digital to analog converter (DAC) 78, and the rechargeable battery 80. FIG. 4 also shows the outside parts connected with the inside parts, including the data transmission port 36, the control panel 42, the display 70, the fingerprint recognition device 30, the locking mechanism 44, and the internal speaker 32.

According to FIG. 7, the processing unit 72 is the central part of the present invention; the connected peripheral devices include the rechargeable battery 80, the storage unit 74, and the data transmission port 36, the control panel 42, the display 70, the fingerprint recognition device 30, the locking mechanism 44 and the decoder 76. The decoder 76 can dispose the image and audio file with commonly know format; for example, the image file format is GIF or JPEG and the audio file format is WAV or MP3. The decoder 76 further coupled to the digital analog converter (DAC) 78 to transmit sound to the internal speaker 32 or the audio output port 34. By the audio output port 34 mentioned above, the present invention is connected to the earphone to work as a walkman, or connected to a speaker or a sound system for generating better acoustic effect.

Moreover, the data transmission port 36 can connect to the other digital device for transmitting pictures, music and the digital file with the other format to the present invention, and then the data is stored in the storage unit 74. The storage unit 74 can be a flash memory or a micro-drive. The main functions of the present invention are controlled by the control panel 42; by the cooperation of the control panel 42, processing unit 72 and the display 70, a user can select the music, picture or the sound effect while a device is activated (works as a music box) on the display interface; the music is played through the internal speaker 32, the earphone or speaker connected to the audio output port 34; the image is displayed on the display 70. The rechargeable battery 80 is for providing electricity energy to all the parts requiring electricity; the recharge port 38 is for providing and supplying electricity.

As is understood by a person skilled in the art, the foregoing preferred embodiments of the present invention are illustrated of the present invention rather than limiting of the present invention. The coverage of the present invention should be interpreted according to the appended claims and its equivalence. It will be appreciated that various change and amendment made by a person skilled in the art is done according to the spirit of the present invention, and therefore is within the scope of the appended claims.

The invention claimed is:

1. A heart-shaped structure with altering appearance, includes:
    a first base with an accommodating cavity;
    a second base flippable and pivot-jointed to said accommodating cavity;
    a first upper cover with a locking mechanism, wherein said first upper cover is pivot-jointed to a side of said first base; and
    a second upper cover flippable and pivot-jointed to a side of said second base.

2. The heart-shaped structure with altering appearance according to claim 1, further including:
    a processing unit inside said first base;
    a decoder inside said first base and coupled to said processing unit to disposed the file with commonly known image or audio format;
    a digital to analog converter inside said first base and coupled to said decoder to play music by a speaker or to display image on a display;
    a rechargeable battery inside said first base and coupled to said processing unit to provide electricity to the parts requiring electricity;
    a storage unit inside said first base and coupled to said processing unit for storing digital data; and
    a display monitor located within said accommodating cavity and coupled to said processing unit for displaying image and control interface.

3. A heart-shaped structure with altering appearance according to claim 2, further comprising a internal speaker on the outer casing of said first base and coupled to said digital analog converter to play music.

4. A heart-shaped structure with altering appearance according to claim 2, further comprising an audio output port on a outer casing of said first base and coupled to said digital analog converter to output music to a earphone, a sound system or a speaker.

5. A heart-shaped structure with altering appearance according to claim 2, further comprising a data transmit port on a outer casing of said first base and coupled to said processing unit for coupling to other digital device for transmitting data.

6. A heart-shaped structure with altering appearance according to claim 2, further comprising a recharge port on a outer casing of said first base and coupled to said rechargeable battery for supply electricity to said battery, wherein a power switch is located on said outer casing of said first base and coupled to said processing unit for activating or deactivating the internal part coupled to said processing unit.

7. A heart-shaped structure with altering appearance according to claim 2, further comprising a control panel on an outer casing of said first base and coupled to said processing unit for operation or inputting directives.

8. A heart-shaped structure with altering appearance according to claim 7, wherein the function buttons of said control panel including a play/pause button, a forward/backward button and a volume control button.

9. A heart-shaped structure with altering appearance according to claim 2, wherein said display monitor including a liquid crystal display, an organic light emitting display, or a field emitting display.

10. A heart-shaped structure with altering appearance according to claim 2, wherein said storage unit includes a flash memory.

11. A heart-shaped structure with altering appearance according to claim 2, wherein storage unit includes a micro hard disk.

12. A heart-shaped structure with altering appearance according to claim 1, further including a fingerprint recognition device equipped on said heart-shaped structure.

* * * * *